United States Patent Office.

CARL STOEHR, OF KIEL, ASSIGNOR TO THE FARBENFABRIKEN, VORMALS FR. BAYER & CO., OF ELBERFELD, GERMANY.

DIMETHYLPIPERAZIN.

SPECIFICATION forming part of Letters Patent No. 514,632, dated February 13, 1894.

Application filed June 19, 1893. Serial No. 478,125. (Specimens.)

*To all whom it may concern:*

Be it known that I, CARL STOEHR, chemist, doctor of philosophy, and docent at the University of Kiel, Prussia, Germany, a subject of the Emperor of Germany, residing at Kiel, Prussia, Germany, assignor to the FARBENFABRIKEN, VORMALS FR. BAYER & CO., of Elberfeld, Germany, have invented a new and useful Improvement in the Manufacture of a new Pharmaceutical Product; and I do hereby declare the following to be a full, clear, and exact description thereof.

My invention relates to the production of a new pharmaceutical product, the chemical name of which is "dimethyl piperazin," and which results from distilling glycerin with ammonium chlorid (or ammonium cromid) with the addition of products capable of giving off ammonia with ease (such as, for instance, ammonium carbonate, carbamid of of ammonia or other inorganic or organic ammonium salts).

In carrying out my invention practically I proceed as follows: Three hundred parts, by weight, of glycerin are distilled with from one hundred to one hundred and twenty parts, by weight, of ammonium chlorid and from thirty to fifty parts by weight, of ammonium carbonate. The distillate resulting in this manner contains pyrazin bases (chiefly the so-called dimethyl pyrazin) mixed with water, ammonia and substances possessing an aldehyde-like smell. The by-products are then removed by acidulating the distillate and subsequently distilling with steam. From the remaining liquid the pyrazin bases are separated by means of alkali, and the free bases are then isolated from the watery liquid in usual manner. The mixture of the pyrazin bases thus obtained is subjected to an exact distillation process, in order to separate the homologous pyrazins viz—dimethyl-pyrazin and dimethylethyl pyrazin (the latter showing different boiling points).

The dimethyl pyrazin boils at 155° centigrade (with the so called correction) and possesses the following composition:

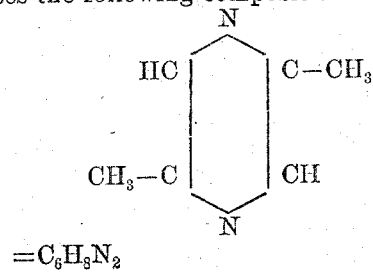

$=C_6H_8N_2$

In treating the above dimethylpyrazin with reducing agents (such as metallic sodium in presence of alcohol, or the like) six hydrogen atoms are added to one molecule of dimethyl pyrazine, "dimethyl piperazin" being formed in this manner, which possesses the formula:

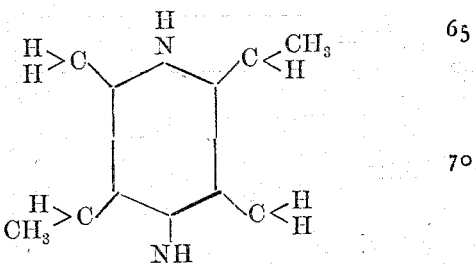

In order to effect the said reduction, ten parts, by weight, of dimethylpyrazin are dissolved in about one hundred parts, by weight, of absolute alcohol, and the resulting solution is heated at about from 50° to 70° centigrade. Thirty parts, by weight, of finely cut metallic sodium are gradually added to the above alcoholic solution. The reduction is complete, if the metallic sodium employed is no longer distinguishable. After adding one hundred parts, by weight, of water, the resulting mixture is subjected to a distillation process. Alcohol distills at first, and then when steam is employed dimethyl piperazin in a pure state distills over. The new product "dimethylpiperazin" is easily soluble in water and alcohol, soluble in ether with great difficulty. When crystallized out of benzine or chloroform, beautiful white bright scales are obtained melting at 118° centigrade and boiling at 162° centigrade (corr.) The solution of dimethylpiperazin in water shows an evident alkaline reaction.

The method for the above reduction may be varied by employing alkaline lye and zinc dust or tin and hydrochloric acid. It forms with mineral acids (as for example hydrochloric acid, sulfuric acid or the like) characteristic salts.

The dimethyl piperazin and the salts thereof are employed for pharmaceutical purposes, and are effective in a similar manner as piperazine and the salts thereof.

In gout and the maladies belonging to the gouty habit, lithiasis, uretic concretions and the uric acid diathesis, and in the forms of rheumatism depending upon these conditions, dimethylpiperazine (or the salts thereof) are especially indicated.

The daily dose of dimethylpiperazin is about thirty-two grains to be given in divided doses, well diluted with water.

I am aware of the body described by Ladenburg, *Ber. Deutsche Chem. Gesel.* 24, 2400, 2402, and do not claim the same. My body is different from that of Ladenburg, being an isomer thereof. The structural differences are exhibited in the following formulæ:

Stoehr's body:

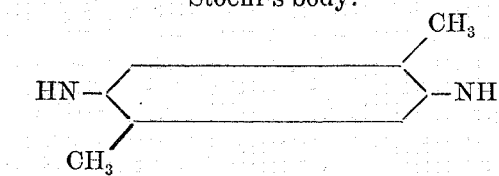

Ladenburg's body:

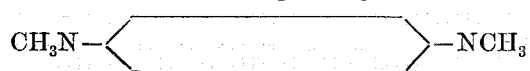

Having now described my invention and in what manner the same is to be performed, what I claim as new, and desire to secure by Letters Patent, is—

1. The process for the production of a new pharmaceutical product by first distilling glycerin with ammonium chlorid (or cromid) in the presence of agents easily giving off ammonia, isolating the thus formed dimethylpyrazin in a suitable manner and subsequently reducing the last-named product.

2. As a new article of manufacture, the pharmaceutical product termed dimethylpiperazin, having the formula $C_6 H_{14} N_2$, forming white crystals, melting at 118° centigrade and boiling at 162° centigrade (corr.), easily soluble in water and alcohol, soluble in benzine and chloroform, and almost insoluble in ether, substantially as described.

In testimony whereof I have signed my name in the presence of two subscribing witnesses.

CARL STOEHR.

Witnesses:
F. MÜLLER,
N. DITTEMANN.